(12) United States Patent
Wasserman et al.

(10) Patent No.: US 11,717,010 B1
(45) Date of Patent: Aug. 8, 2023

(54) SYSTEMS AND METHODS FOR PROCESSING SEAWEED

(71) Applicant: Sea and Flour, LLC, Philadelphia, PA (US)

(72) Inventors: Arlin Wasserman, Philadelphia, PA (US); Penny Wasserman, Philadelphia, PA (US)

(73) Assignee: Sea and Flour, LLC, Philadelphia, PA (US)

( * ) Notice: Subject to any disclaimer, the term of this patent is extended or adjusted under 35 U.S.C. 154(b) by 0 days.

(21) Appl. No.: 17/954,240

(22) Filed: Sep. 27, 2022

Related U.S. Application Data (60) Provisional application No. 63/352,134, filed on Jun. 14, 2022.

(51) Int. Cl.
*A23L 17/60* (2016.01)
*A21D 2/08* (2006.01)
*A23L 3/40* (2006.01)

(52) U.S. Cl.
CPC .......... *A23L 17/60* (2016.08); *A21D 2/08* (2013.01); *A23L 3/40* (2013.01); *A23V 2002/00* (2013.01)

(58) Field of Classification Search
CPC .......... A23L 17/60; A23L 3/40; A21D 2/08
See application file for complete search history.

(56) References Cited

FOREIGN PATENT DOCUMENTS

CN 103734241 A * 4/2014

OTHER PUBLICATIONS

English translation of KR-102054448-B1 Dec. 10, 2019 (Year: 2019).*

* cited by examiner

*Primary Examiner* — Katherine D Leblanc
(74) *Attorney, Agent, or Firm* — Koiitch Romano Dascenzo Gates LLC (57) ABSTRACT

Methods for processing seaweed. The methods include cold washing seaweed to generate cold-washed seaweed, outgassing the cold-washed seaweed to generate outgassed seaweed, and dry heating the outgassed seaweed to generate dried seaweed. The cold washing may include contacting the seaweed with cold water at a temperature and/or pressure that retains at least a threshold salts fraction of naturally occurring mineral salts in the raw seaweed. The dry heating may include dry heating at a dry-heat temperature that is less than at least one of a char temperature and a burn temperature for the outgassed seaweed and/or that is greater than a pasteurization temperature for the outgassed seaweed. The methods may include compressing the outgassed seaweed to separate water from the outgassed seaweed and/or pulverizing the dried seaweed to generate pulverized seaweed. The methods also may include producing baked goods utilizing the processed and/or pulverized seaweed.

22 Claims, 4 Drawing Sheets

SYSTEMS AND METHODS FOR PROCESSING SEAWEED

RELATED APPLICATION

This application claims priority to U.S. Provisional Patent Application No. 63/352,134, which was filed on Jun. 14, 2022, and the complete disclosure of which is hereby incorporated by reference.

FIELD OF THE DISCLOSURE

The present disclosure relates generally to systems and methods for processing seaweed.

BACKGROUND OF THE DISCLOSURE

Seaweed is relatively abundant in nature, and human consumption of seaweed may provide significant benefits, both to the consumer and to the environment. Historically, seaweed has been consumed by humans in limited ways. This limited consumption may be the result of a variety of factors, including availability of seaweed products, processability of seaweed products, shelf stability of seaweed products, and/or taste of seaweed products. Seaweed consumption generally has been a somewhat acquired taste for many, with most conventional seaweed products possessing a "beachy" or "marine" flavor that may not be acceptable to all consumers. There have been attempts to create seaweed products that are more broadly accepted by consumers; however, these attempts have seen limited success. In addition, it historically has been quite difficult to incorporate seaweed into certain products, such as breads, without transforming the taste, smell, and/or texture of the products such that many in the general public find the resulting product unique at best and unpalatable at worst. It will be beneficial to formulate seaweed products that will be readily accepted by consumers, either on their own or upon incorporation into other products, such as breads and other baked goods. Thus, there exists a need for improved systems and methods of processing seaweed.

SUMMARY OF THE DISCLOSURE

Systems and methods for processing seaweed are disclosed herein. The methods include cold washing raw seaweed to generate cold-washed seaweed and outgassing the cold-washed seaweed for an outgas time to generate outgassed seaweed. The methods also include dry heating the outgassed seaweed to generate dried seaweed. The cold washing may include contacting the raw seaweed with cold water at a cold water temperature and/or a cold water pressure that retains at least a threshold salts fraction of naturally occurring mineral salts in the raw seaweed. The outgassing may include outgassing the cold-washed seaweed at an outgas temperature such that less than a threshold decomposed fraction of the cold-washed seaweed is decomposed during the outgassing. The dry heating may include dry heating the outgassed seaweed at a dry-heat temperature that is less than at least one of a char temperature and a burn temperature for the outgassed seaweed and/or that is greater than a pasteurization temperature for the outgassed seaweed. The methods may include culling a fraction of the seaweed to generate a culled seaweed fraction and a retained seaweed fraction, compressing the outgassed seaweed to separate water from the outgassed seaweed, and pulverizing the dried seaweed to generate pulverized seaweed. The methods also may include producing baked goods utilizing processed and/or pulverized seaweed produced according to the methods.

The systems include a cold-wash structure configured to cold-wash raw seaweed to generate cold-washed seaweed, an outgas structure configured to outgas the cold-washed seaweed to generate outgassed seaweed, and a dry-heat structure configured to dry-heat the outgassed seaweed to generate dried seaweed. The systems further may include one or more of a cull structure configured to cull the seaweed to generate a culled seaweed fraction and a retained seaweed fraction, a compression structure configured to compress the outgassed seaweed to separate water from the outgassed seaweed and to generate outgassed and dewatered seaweed, a pulverizing structure configured to pulverize the dried seaweed to generate pulverized seaweed, and a controller programmed to control operation of at least one other component of the system.

DETAILED DESCRIPTION AND BEST MODE OF THE DISCLOSURE

Figure 1:
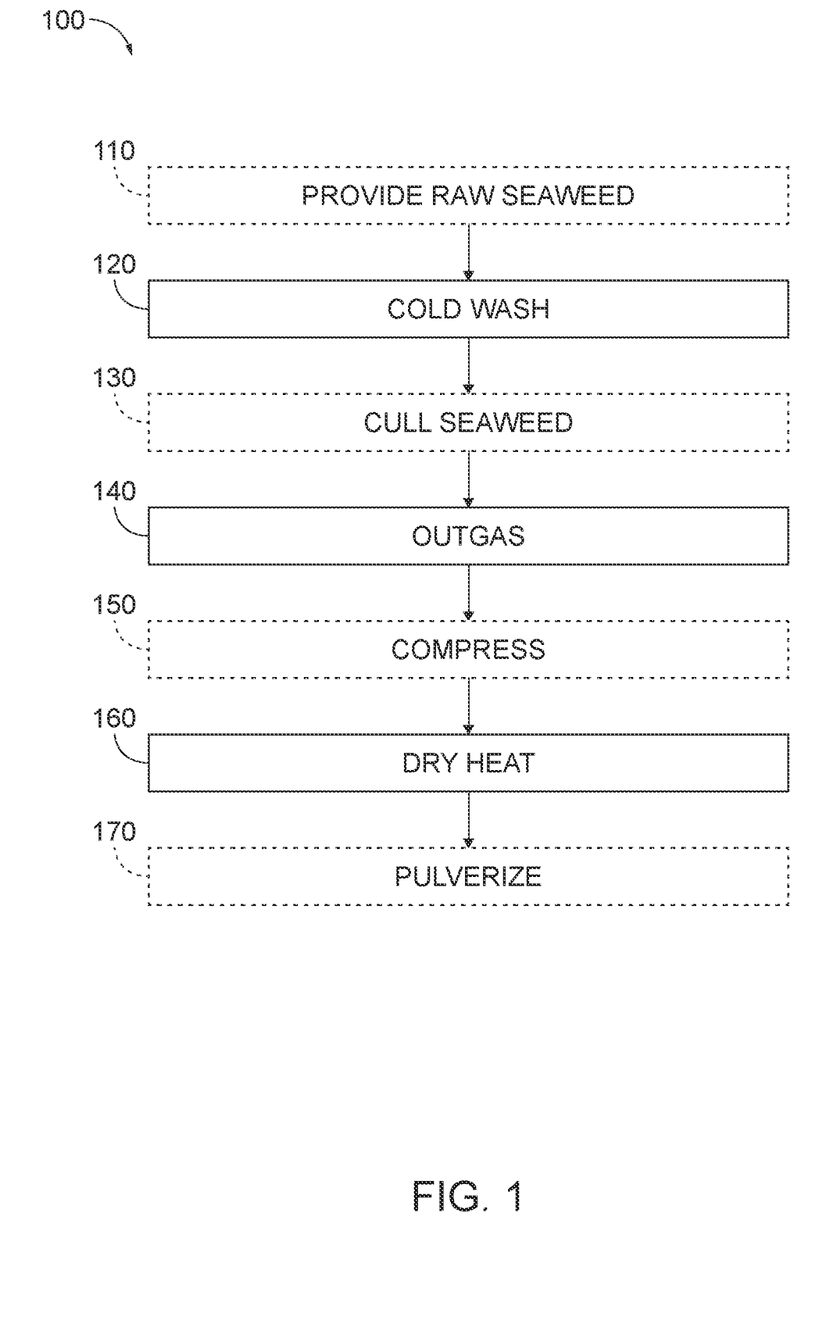
FIG. 1 is a flowchart depicting examples of methods of processing seaweed, according to the present disclosure.
Figure 2:
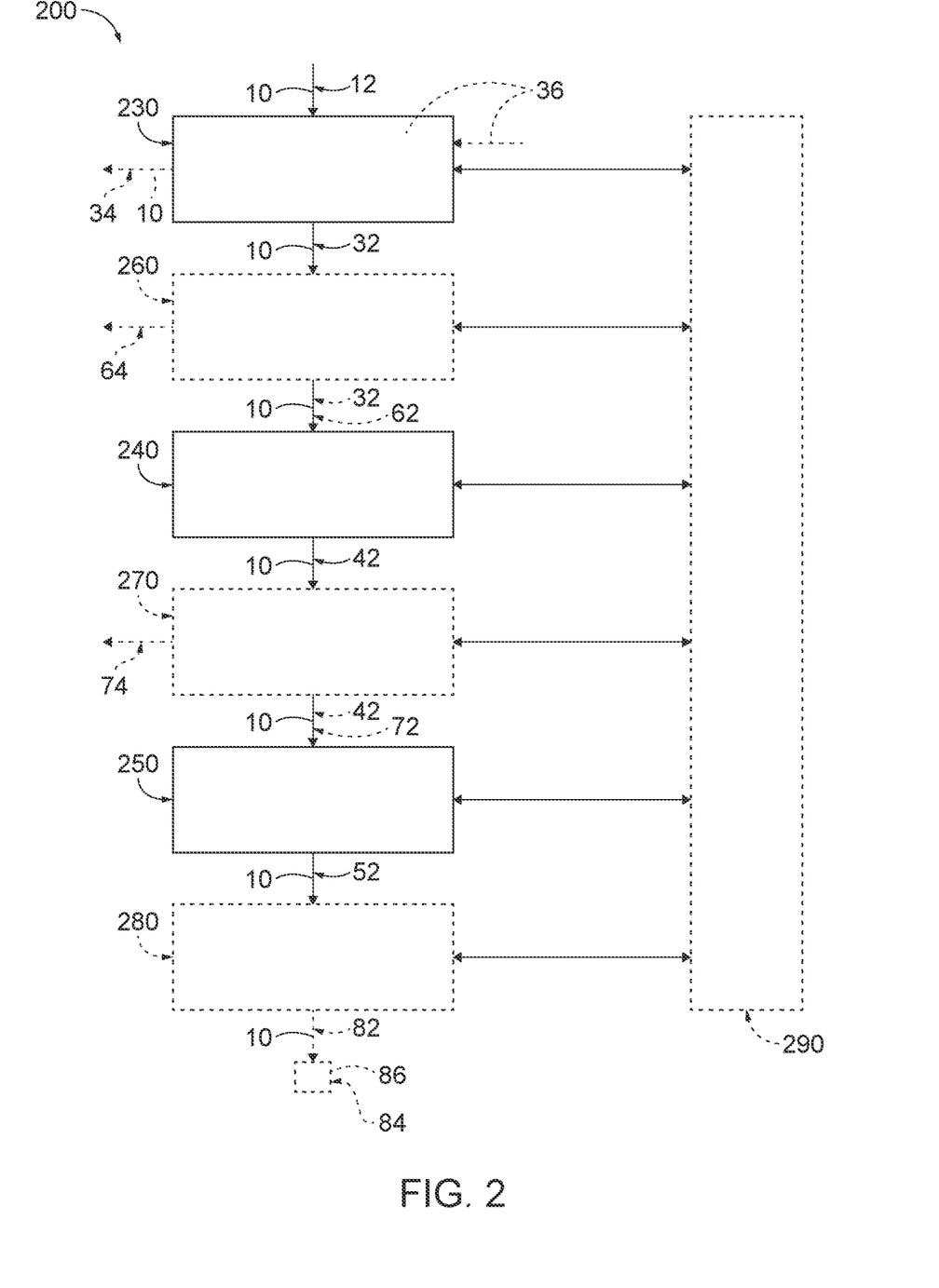
FIG. 2 is a schematic illustration of examples of a system for processing seaweed, according to the present disclosure.
Figure 3:
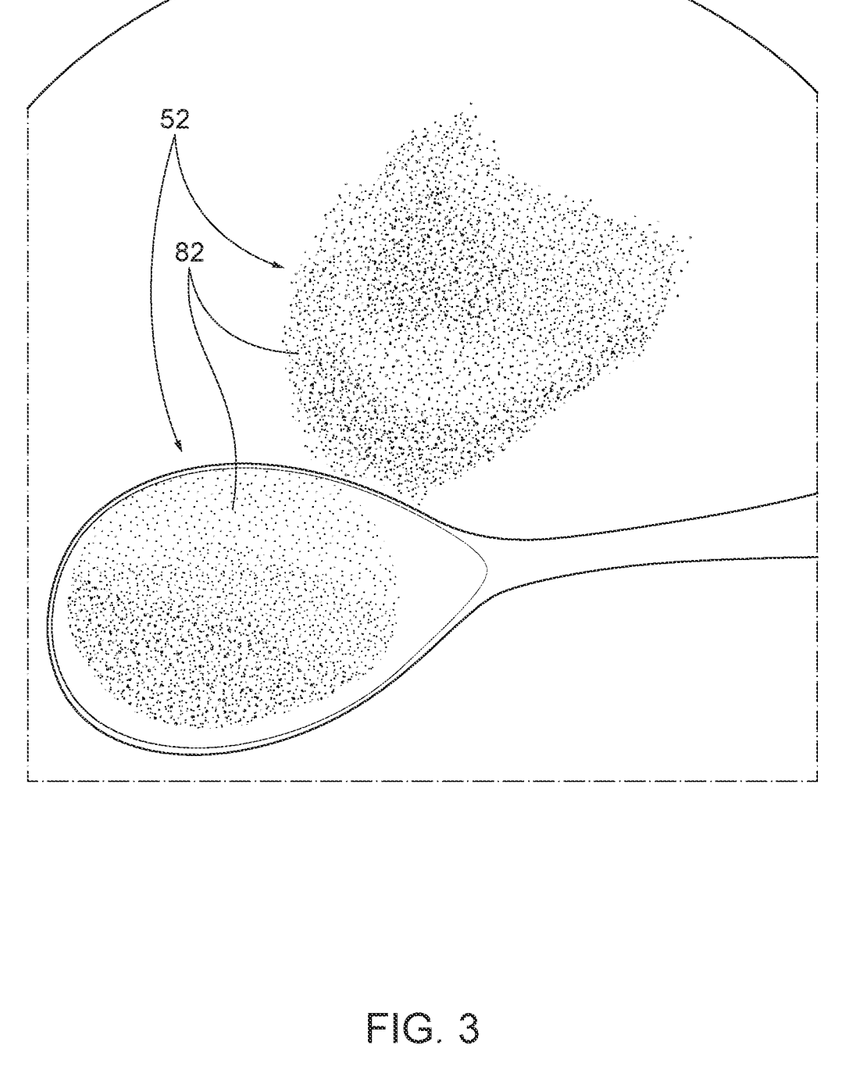
FIG. 3 is an illustration of an example of processed seaweed, according to the present disclosure.
Figure 4:
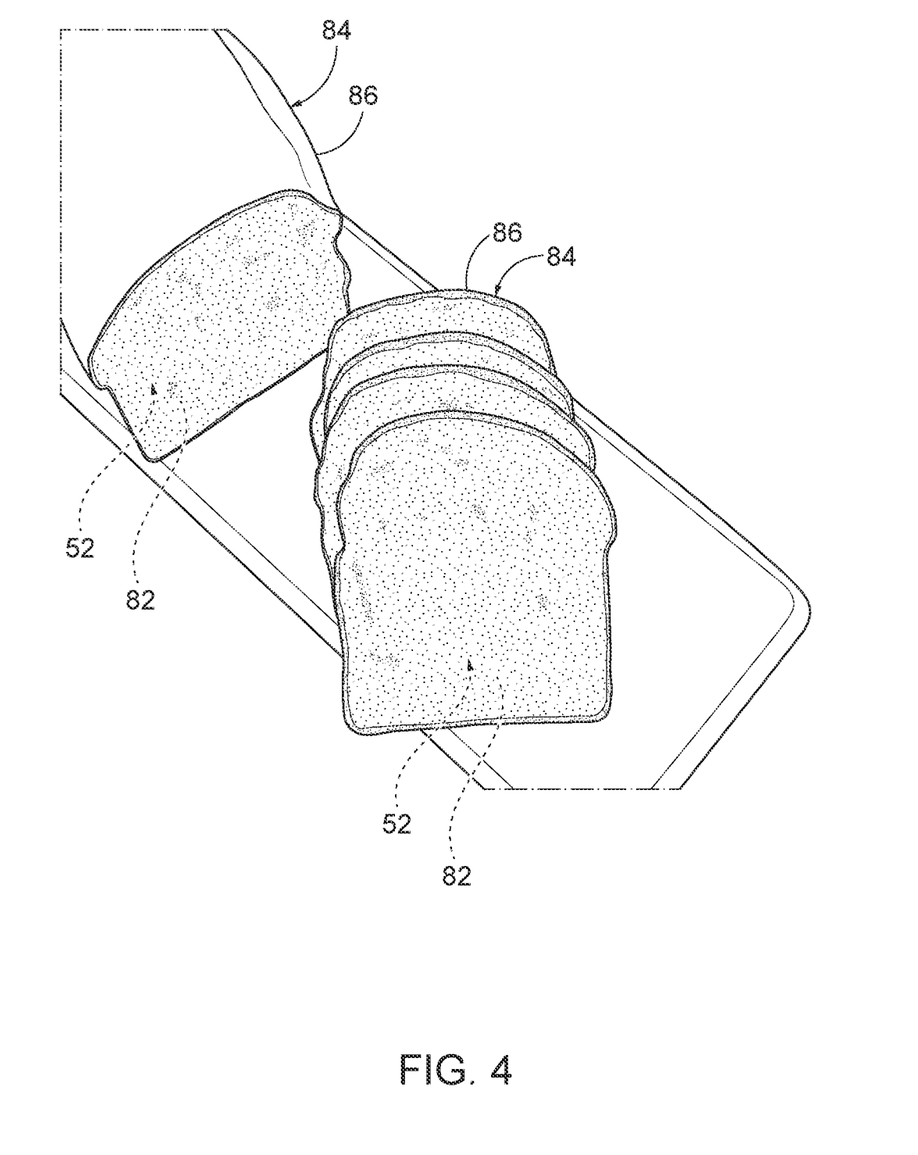
FIG. 4 is an illustration of baked goods in the form of bread produced using processed seaweed, according to the present disclosure.

FIGS. 1-2 provide examples of methods 100 and systems 200 for processing seaweed 10, according to the present disclosure. FIG. 3 provides an example of pulverized, or processed, seaweed produced according to the present disclosure, and FIG. 4 provides an example of baked goods (e.g., bread) produced utilizing processed seaweed according to the present disclosure. Elements that serve a similar, or at least substantially similar, purpose are labeled with like numbers in each of FIGS. 1-4, and these elements may not be discussed in detail herein with reference to each of FIGS. 1-4. Similarly, all elements may not be labeled in each of FIGS. 1-4, but reference numerals associated therewith may be utilized herein for consistency. Elements, components, and/or features that are discussed herein with reference to one or more of FIGS. 1-4 may be included in and/or utilized with any of FIGS. 1-4 without departing from the scope of the present disclosure. In general, elements that are likely to be included in a particular embodiment are illustrated in solid lines, while elements that are optional are illustrated in dashed lines. However, elements that are shown in solid lines may not be essential to all embodiment and, in some embodiments, may be omitted without departing from the scope of the present disclosure.

FIG. 1 is a flowchart depicting examples of methods 100 for processing seaweed, according to the present disclosure. Methods 100 may include providing raw seaweed at 110, and methods 100 include cold washing at 120. Methods 100 also may include culling seaweed at 130, and methods 100 include outgassing at 140. Methods 100 further may include compressing at 150, include dry heating at 160, and may include pulverizing at 170. In some examples, methods 100 may be, or may be referred to herein as being, methods 100 of operating systems 200, which are disclosed herein. In such examples, systems 200 may perform any suitable step and/or steps of methods 100. However, this is not required to all methods 100, and it is within the scope of the present disclosure that methods 100 may be performed by any suitable type, form, and/or number of structures, including those that differ from systems 200 and/or that do not utilize some or all of the components of systems 200.

Providing raw seaweed at 110 may include providing any suitable raw seaweed in any suitable manner. This may include harvesting, purchasing, and/or obtaining the raw seaweed. As used herein, the phrase "raw seaweed" may refer to unprocessed seaweed, to naturally occurring seaweed, and/or to seaweed in a natural state, such as a state in which the seaweed may exist in the ocean. This may include seaweed that recently was harvested, seaweed that has not been treated with chemicals (e.g., untreated seaweed), and/or seaweed that has not been heated above a pasteurization temperature (e.g., unheated seaweed) and/or has not been dehydrated or otherwise dewatered (e.g., undehydrated seaweed, hydrated seaweed, and/or naturally hydrated seaweed).

The raw seaweed may include, may consist of, or may consist essentially of a single variety of raw seaweed. Alternatively, the raw seaweed may include, may consist of, or may consist essentially of a plurality of different and/or distinct varieties of raw seaweed, including at least 2, at least 3, at least 4, or more than 4 varieties of raw seaweed. Examples of the raw seaweed and/or of varieties of raw seaweed include kelp, sugar kelp, skinny kelp, rockweed, dulse, red dulse, wakame, kombu, nori, hijiki, Irish moss, and/or sea lettuce. These examples of raw seaweed may form all or a portion of raw seaweed 12, as discussed herein in connection with systems 200. When the raw seaweed includes the plurality of different varieties of raw seaweed, the varieties that are present and/or a relative proportion of the varieties present within the raw seaweed may be selected, determined, and/or established based, at least in part, on a desired texture and/or flavor for dried seaweed that is produced by and/or generated from and/or by methods 100.

Cold washing at 120 may include cold washing raw seaweed to produce and/or to generate cold-washed seaweed. This may include removing undesired materials from the raw seaweed. Examples of such undesired materials include sand, debris, and/or materials other than raw seaweed 12. The resulting cold-washed seaweed may include less, minimal, or even no undesired materials when compared to the raw seaweed. In addition, the cold washing at 120 permits the cold-washed seaweed to retain, or to retain a majority of, natural occurring nutrients present within the raw seaweed. This may provide significant health benefits upon consumption of the dried seaweed produced by methods 100 when compared to conventional dried seaweed products, which may be produced with a hot-wash structure or process instead of the cold washing at 120. In some examples, the cold washing at 120 may include cold washing with, via, and/or utilizing a cold-wash structure, examples of which are disclosed herein with reference to cold-wash structure 230 of systems 200. Additional examples of cold-washed seaweed and undesired materials are discussed in connection with systems 200 as cold-washed seaweed 32 and undesired materials 34.

The cold washing at 120 may include contacting the raw seaweed with cold water at a cold water temperature. Examples of the cold water temperature include temperatures of at least 0.25 degrees Celsius (° C.), at least 0.5° C., at least 0.75° C., at least 1° C., at least 2° C., at least 3° C., at least 4° C., at least 5° C., at least 6° C., at least 8° C., at least 10° C., at most 20° C., at most 18° C., at most 16° C., at most 14° C., at most 12° C., at most 10° C., at most 8° C., at most 6° C., at most 5° C., at most 4° C., at most 3.5° C., a most 3° C., at most 2.5° C., and/or at most 2° C. The cold water temperature may be selected such that the cold-washed seaweed retains at least a threshold salts fraction of naturally occurring mineral salts in the raw seaweed. These naturally occurring mineral salts may be present within a cellular structure of the raw seaweed, may be internal to the raw seaweed, may not include saltwater mineral salts present within saltwater obtained with the raw seaweed, and/or may include only a minor fraction of the saltwater mineral salts. Examples of the threshold salts fraction include 50 weight percent (wt %), 55 wt %, 60 wt %, 65 wt %, 70 wt %, 75 wt %, 80 wt %, 85 wt %, 90 wt %, 95 wt %, or 99 wt %.

The cold water temperature may be selected such that the cold-washed seaweed retains at least a threshold cell wall fraction of cell walls in, or from, the raw seaweed. Stated differently, the cold water temperature may be selected to avoid degradation, thermal degradation, substantial degradation, and/or substantial thermal degradation of cell walls in, or from, the raw seaweed. Examples of the threshold cell wall fraction include 50 wt %, 55 wt %, 60 wt %, 65 wt %, 70 wt %, 75 wt %, 80 wt %, 85 wt %, 90 wt %, 95 wt %, or 99 wt %.

The cold washing at 120 may include immersing the raw seaweed in cold water. Additionally or alternatively, the cold washing at 120 may include flowing cold water across the raw seaweed. This may include flowing the cold water at a cold water flow rate. The cold water flow rate may be selected to agitate the raw seaweed and/or to avoid mechanical degradation of the raw seaweed. Examples of the cold water flow rate include at least 6 liters per minute (L/m), at least 7 L/m, at least 8 L/m, at least 9 L/m, at least 10 L/m, at least 12 L/m, at least 14 L/m, at least 16 L/m, at least 18 L/m, at least 20 L/m, at most 24 L/m, at most 22 L/m, at most 20 L/m, at most 18 L/m, at most 16 L/m, at most 14 L/m, at most 12 L/m, and/or at most 10 L/m.

The cold washing at 120 additionally or alternatively may include spraying the raw seaweed with cold water. Such spraying may permit directed application of the cold water to specific regions of the raw seaweed and/or may facilitate agitation of the raw seaweed by the spray. Such spraying also may facilitate, improve, and/or contribute to the removal of undesired materials from the raw seaweed.

The cold washing at 120 additionally or alternatively may include aerating the cold water during contact between the cold water and the raw seaweed. This may include aerating the cold water with air, with nitrogen, and/or with oxygen. Such aerating further may agitate the raw seaweed and/or may facilitate additional, or improved, outgassing of the raw seaweed, such as via stripping volatile compounds from the raw seaweed.

The cold washing at 120 additionally or alternatively may include agitating the cold water and/or the raw seaweed during contact between the cold water and the raw seaweed. Such agitating may improve contact between the cold water and the raw seaweed and/or may improve, or increase, an efficiency of the cold washing at 120.

The cold washing at 120 additionally or alternatively may include conveying the raw seaweed through, and/or agitating the raw seaweed with, cold water during contact between the cold water and the raw seaweed. Such conveying may improve an overall efficiency of methods 100, such as via permitting the cold washing at 120 to be performed as part of a continuous and/or semi-batch process.

The cold washing at 120 may include maintaining at most a threshold cold water pressure of the cold water during contact between the cold water and the raw seaweed. Doing so may decrease a potential for damage to and/or degradation of the raw seaweed during the cold washing at 120. Examples of the threshold cold water pressure include 2 kilopascals (kPa), 3 kPa, 4 kPa, 5 kPa, 6 kPa, 7 kPa, 8 kPa, 10 kPa, 15 kPa, or 20 kPa. Stated differently, the cold water pressure may be selected such that the cold-washed seaweed retains at least a threshold cell wall fraction of cell walls in, or from, the raw seaweed. Examples of the threshold cell wall fraction include 50 wt %, 55 wt %, 60 wt %, 65 wt %, 70 wt %, 75 wt %, 80 wt %, 85 wt %, 90 wt %, 95 wt %, or 99 wt %.

The cold washing at 120 may include contacting the raw seaweed with cold water for a cold-wash time. Such contacting may decrease a potential for over-washing of the raw seaweed and/or for under-washing of the raw-seaweed. Examples of the cold-wash time include at least 5 minutes, at least 10 minutes, at least 15 minutes, at least 20 minutes, at least 30 minutes, at most 60 minutes, at most 50 minutes, at most 40 minutes, at most 30 minutes, at most 20 minutes, and/or at most 10 minutes.

It is within the scope of the present disclosure that the cold washing at 120 may include cold washing the raw seaweed without chemically or structurally altering the raw seaweed, and/or without preserving the raw seaweed. Stated differently, the cold washing at 120 may include cold washing without addition of a salt, a soap, a cleanser, a bactericide, a preservative, a fixative, a brightener, and/or a chemical other than water, which may be or include tap water, to the raw seaweed and/or to the cold-washed seaweed.

Methods 100 may include initiating the cold washing at 120 in less than a threshold processing time from, or subsequent to, harvest of the raw seaweed. Doing so may decrease a potential for damage to, decay of, and/or decomposition of the raw seaweed prior to initiation of methods 100. Examples of the threshold processing time include 3 hours, 6 hours, 12 hours, 18 hours, 24 hours, 30 hours, 36 hours, 48 hours, 60 hours, or 72 hours.

The cold washing at 120 may be performed with any suitable timing and/or sequence during methods 100. As examples, the cold washing at 120 may be performed subsequent to and/or at least partially concurrently with the providing at 110 and/or the culling at 130. As additional examples, the cold washing at 120 may be performed prior to the culling at 130, prior to the outgassing at 140, prior to the compressing at 150, prior to the dry heating at 160, and/or prior to the pulverizing at 170.

Culling seaweed at 130 may include culling a fraction of the seaweed to produce and/or generate a culled seaweed fraction and a retained seaweed fraction. For example, the culling at 130 may include removing one or more undesired components from the seaweed as the culled seaweed fraction. Examples of the one or more undesired components include seaweed stems, seaweed stipules, and/or seaweed veins of greater than a threshold size. The retained seaweed fraction may include portions of the seaweed, which may be raw seaweed and/or cold-washed raw seaweed, that may be acceptable for inclusion within the dried seaweed produced via methods 100, such as leaves of the seaweed and/or stems, stipules, and/or veins of the seaweed that are smaller than a threshold size. The threshold size may be a matter of design choice that may vary, for example, based on the variety of seaweed being utilized in methods 100, the intended size of the pulverized seaweed produced via the methods, and/or the intended use of the dried and/or pulverized seaweed produced by the methods. Additional examples of the retained seaweed fraction and the culled seaweed fraction are discussed herein with reference to retained seaweed fraction 62 and culled seaweed fraction 64 of systems 200.

The culling at 130 may utilize any suitable structure or technique for separating the seaweed into designated retained and culled seaweed fractions. In some examples, the culling at 130 may include culling with, via, and/or utilizing a cull structure, examples of which are disclosed herein with reference to cull structure 260 of systems 200. In some examples, the culling at 130 may include culling the cold-washed seaweed. In such examples, methods 100 further may include utilizing the retained seaweed fraction during the outgassing at 140 as the cold-washed seaweed.

Outgassing at 140 may include outgassing the cold-washed seaweed for an outgas time to produce and/or to generate outgassed seaweed. The outgassing at 140 may permit compounds, which contribute to the "beachy" and/or "marine" flavor of conventional seaweed products, to dissipate, to react with oxygen in the air, and/or to outgas from the cold-washed seaweed. Stated differently and as discussed in more detail herein, the utilization of outgassed seaweed to generate dried seaweed, according to the present disclosure, may permit dried seaweed to have a more neutral flavor and/or scent, as compared to conventional dried seaweed products, including those that are produced without the outgassing at 140 and/or without the subsequently discussed outgas structure 240 of systems 200. As used herein, references to dried seaweed having a more neutral flavor and/or scent additionally and/or alternatively may describe the dried seaweed as having a less marine, more pleasing, more bread-like, less sulfuric, less hydrogen sulfidic, less dimethyl sulfidic, less umami-like, less briny, and/or less fishy flavor and/or scent.

The outgassed seaweed also may be referred to herein as and/or may be unheated seaweed, high-moisture seaweed, unboiled seaweed, and/or seaweed that has not previously been purposefully heated. In some examples, the outgassing at 140 may be performed with, via, and/or utilizing an outgas structure, examples of which are disclosed herein with reference to outgas structure 240 of systems 200. Additional examples of outgassed seaweed also are discussed in connection with outgassed seaweed 42 of systems 200.

The outgassing at 140 may include outgassing at an outgas temperature. Examples of the outgas temperature include temperatures of at least 0.25 degrees Celsius (° C.), at least 0.5° C., at least 0.75° C., at least 1° C., at least 2° C., at least 3° C., at least 4° C., at least 5° C., at least 6° C., at least 8° C., at least 10° C., at most 14° C., at most 12° C., at most 10° C., at most 8° C., at most 6° C., at most 5° C., at most 4° C., at most 3.5° C., a most 3° C., at most 2.5° C., and/or at most 2° C. The outgas temperature may be selected such that less that a threshold decomposed fraction of the cold-washed seaweed is decomposed in the outgassed seaweed and/or during the outgassing at 140. Examples of the threshold decomposed fraction include 5%, 4%, 3%, 2%, 1%, 0.5%, 0.25%, or 0.1%.

The outgassing at 140 may include outgassing for an outgas time. Examples of the outgas time include at least 3 hours, at least 4 hours, at least 6 hours, at least 9 hours, at least 12 hours, at least 15 hours, at least 18 hours, at least 21 hours, at least 24 hours, at least 27 hours, at least 30 hours, at least 33 hours, at least 36 hours, at least 39 hours, at least 42 hours, at least 45 hours, at most 96 hours, at most 90 hours, at most 84 hours, at most 78 hours, at most 72 hours, at most 69 hours, at most 66 hours, at most 63 hours, at most 60 hours, at most 57 hours, at most 54 hours, at most 51 hours, at most 48 hours, at most 45 hours, at most 42 hours, at most 39 hours, at most 36 hours, at most 33 hours, at most 30 hours, at most 27 hours, and/or at most 24 hours.

The outgassing at 140 may include outgassing at less than a threshold outgas humidity. Examples of the threshold outgas humidity include 20 percent relative humidity (% RH), 18% RH, 16% RH, 14% RH, 12% RH, 10% RH, 8% RH, 6% RH, 4% RH, 2% RH, or 1% RH. Outgassing at less than the threshold outgas humidity may permit and/or facilitate partial drying of the seaweed during the outgassing at 140.

The outgassing at 140 may include outgassing the cold-washed seaweed in a single layer. Doing so may provide improved outgassing and/or may decrease an overall time needed for the outgassing at 140. Alternatively, the outgassing at 140 may include outgassing a stack, or a pile, of cold-washed seaweed, which may include a plurality of layers of cold-washed seaweed. Doing so may permit a larger amount of cold-washed seaweed to be outgassed within a given area or outgas structure.

The outgassing at 140 may be performed with any suitable structure, timing, and/or sequence during methods 100. As examples, the outgassing at 140 may be performed subsequent to the providing at 110, subsequent to the cold washing at 120, subsequent to the culling at 130, subsequent to the dry heating at 160, and/or subsequent to the pulverizing at 170. As additional examples, the outgassing at 140 may be performed prior to the compressing at 150, prior to the dry heating at 160, and/or prior to the pulverizing at 170. It also is within the scope of the present disclosure that the outgassing at 140 may occur in more than one outgassing period, and/or at least partially and/or at least substantially concurrently with the other steps of methods 100. In some examples, the outgassing at 140 may include at least an outgassing period after the dry heating at 160, such as while the dried seaweed and/or pulverized seaweed is cooling and/or prior to use, packaging, or storage of the dried and/or pulverized seaweed. In some such examples, this outgassing period may be at least 1 hour, at least 2 hours, at least 4 hours, at least 6 hours, at least 12 hours, at least 18 hours, at least 24 hours, at most 36 hours, at most 30 hours, at most 24 hours, at most 18 hours, at most 12 hours, and/or at most 6 hours.

In some examples, methods 100 may include initiating the outgassing at 140 within a threshold initiation time of ceasing the cold washing at 120. Examples of suitable threshold initiation times include 5 minutes, 10 minutes, 15 minutes, 30 minutes, 45 minutes, 1 hour, 2 hours, 4 hours, 6 hours, 9 hours, 12 hours, 18 hours, or 24 hours. Stated differently, and in some examples, less than the threshold initiation time may elapse between performing the cold washing at 120 and performing the outgassing at 140. Initiating the outgassing within a threshold initiation time of ceasing the cold washing may decrease a potential for decay of and/or damage to the cold-washed seaweed prior to initiation of the outgassing at 140.

Compressing at 150 may include compressing the outgassed seaweed to separate liquids, such as water, from the outgassed seaweed and to generate outgassed and dewatered seaweed. The compressing at 150 may be performed using any suitable structure and/or process to remove liquids, such as at least a threshold quantity of liquids, from the seaweed and thus to produce outgassed and dewatered seaweed that has a lower liquid content than the outgassed seaweed prior to the compressing at 150. In some examples, the compressing at 150 may be performed with, via, and/or utilizing a compression structure, examples of which are disclosed herein with reference to compression structure 270 of systems 200.

The compressing at 150 may be performed manually, including with one or more user's hands and/or by manually operating a mechanical compression structure. Additionally or alternatively, the compressing at 150 may be performed using a powered compression structure and/or an automated compression structure. Additional examples of outgassed and dewatered seaweed also are discussed in connection with outgassed and dewatered seaweed 72 of systems 200. When methods 100 include the compressing at 150, methods 100 further may include utilizing the outgassed and dewatered seaweed, during the dry heating at 160, as the outgassed seaweed.

The compressing at 150 may include separating a threshold fraction of water, present within the outgassed seaweed, from the outgassed seaweed. Examples of the threshold fraction of water include at least 20%, at least 30%, at least 40%, at least 50%, at least 60%, at most 80%, at most 70%, at most 60%, at most 50%, and/or at most 40%.

Dry heating at 160 may include dry heating the outgassed seaweed to produce and/or to generate the dried seaweed. This may include dry heating the outgassed seaweed in a dry environment and/or in an environment with less than a threshold dry-heating humidity. Examples of the threshold dry-heating humidity include 20% RH, 18% RH, 16% RH, 14% RH, 12% RH, 10% RH, 8% RH, 6% RH, 4% RH, 2% RH, or 1% RH. In some examples, the dry heating at 160 may include blowing dry-heated air past and/or across the outgassed seaweed to produce and/or generate the dried seaweed.

The dry heating at 160 may include dry heating with, via, and/or utilizing a dry-heat structure. Examples of the dry-heat structure are disclosed herein with reference to dry-heat structure 250 of systems 200. Examples of the dried seaweed are disclosed herein with reference to dried seaweed 52 produced with systems 200.

In some examples, methods 100 may include arranging the outgassed seaweed in at least one layer, which may include arranging the outgassed seaweed in a single layer or a plurality of layers, during the dry heating at 160. In some such examples, methods 100 may include supporting the outgassed seaweed on a porous and/or air-permeable surface, such as a screen and/or a drying rack, during the dry heating at 160.

The dry heating at 160 may include dry heating at a dry-heat temperature. The dry-heat temperature may be less than a char temperature of the outgassed seaweed and/or may be less than a burn temperature for the outgassed seaweed. Additionally or alternatively, the dry-heat temperature may be greater than a pasteurization temperature for the outgassed seaweed. Additional examples of the dry-heat temperature are disclosed herein.

Methods 100 may include initiating the dry heating at 160 at a first dry-heat temperature and ramping (i.e., increasing), or subsequently ramping, from the first dry-heat temperature to a second dry-heat temperature. The first dry-heat temperature may be less than the second dry-heat temperature and/or may be selected to avoid steaming and/or charring of the outgassed seaweed upon initiation of the dry heating at 160. The second dry-heat temperature may be sufficient to kill bacteria within the outgassed seaweed and/or to pasteurize the outgassed seaweed. With this in mind, the dried seaweed also may be referred to herein as bacteria-free dried seaweed and/or as pasteurized dried seaweed.

Examples of the first dry-heat temperature include at least 30° C., at least 32° C., at least 34° C., at least 36° C., at least 38° C., at least 40° C., at most 46° C., at most 44° C., at most 42° C., at most 40° C., and/or at most 38° C. Examples of the ramping from first dry-heat temperature and/or of the second dry-heat temperature include at least 70° C., at least 71° C., at least 72° C., at least 73° C., at most 75° C., at most 74° C., and/or at most 73° C. A more specific example of the second dry-heat temperature is 72.2° C.

The ramping from the first dry-heat temperature to the second dry-heat temperature may include ramping during a ramp time. Examples of the ramp time include at least 2 minutes, at least 4 minutes, at least 6 minutes, at least 8 minutes, at least 10 minutes, at most 30 minutes, at most 25 minutes, at most 20 minutes, at most 15 minutes, and/or at most 10 minutes.

The dry heating at 160 further may include maintaining the second dry-heat temperature or maintaining the seaweed at the second dry-heat temperature, such as for a second dry-heat time. Examples of the second dry-heat time include at least 10 minutes, at least 15 minutes, at least 20 minutes, at least 25 minutes, at least 30 minutes, at most 48 hours, at most 45 hours, at most 42 hours, at most 39 hours, at most 36 hours, at most 33 hours, at most 30 hours, at most 27 hours, at most 24 hours, at most 21 hours, at most 18 hours, at most 15 hours, and/or at most 12 hours.

The dry heating at 160 further may include decreasing from the second dry-heat temperature to a third dry-heat temperature and/or maintaining at the third dry-heat temperature. The third dry-heat temperature may be selected to permit and/or to facilitate additional drying of the seaweed without damage to, burning of, and/or charring of the seaweed. Examples of the third dry-heat temperature include at least 51° C., at least 54° C., at least 57° C., at least 60° C., at least 63° C., at least 66° C., at most 75° C., at most 72° C., at most 69° C., at most 66° C., at most 63° C., at most 60° C., at most 57° C., and/or at most 54° C.

The maintaining at the third dry-heat temperature may include maintaining for a third dry-heat time. Examples of the third dry-heat time include at least 6 hours, at least 9 hours, at least 12 hours, at least 15 hours, at least 18 hours, at least 21 hours, at least 24 hours, at most 48 hours, at most 45 hours, at most 42 hours, at most 39 hours, at most 36 hours, at most 33 hours, at most 30 hours, at most 27 hours, at most 24 hours, at most 21 hours, at most 18 hours, at most 15 hours, and/or at most 12 hours.

Additionally or alternatively, the maintaining at the third dry-heat temperature may include maintaining until the outgassed seaweed experiences a threshold mass loss. Stated differently, the dry heating at 160 may be performed until the outgassed seaweed experiences the threshold mass loss. This may be accomplished, for example, by continuing the dry heating at 160, increasing the second dry-heat time, and/or increasing the third dry-heat time until the outgassed seaweed experiences the threshold mass loss. As an example, the dry heating at 160 may include dry heating until a mass-ratio of a mass of the dried seaweed to a mass of the outgassed seaweed is less than a threshold mass-ratio and/or within a threshold mass-ratio range. Examples of the threshold mass-ratio include 0.04, 0.05, 0.06, 0.07, 0.08, 0.09, or 0.10. Examples of the threshold mass-ratio range include at least 0.04, at least 0.05, at least 0.06, at least 0.07, at least 0.08, at least 0.09, at least 0.10, at most 0.12, at most 0.11, at most 0.10, at most 0.09, at most 0.08, at most 0.07, and/or at most 0.06.

In some examples, the dry heating at 160 may include dry heating to a threshold water activity within the dried seaweed, such as to a water activity that will permit, provide, and/or ensure a desired shelf stability for the dried seaweed. This may be accomplished, for example, by continuing the dry heating at 160, increasing the second dry-heat time, and/or increasing the third dry-heat time until the outgassed seaweed has the threshold water activity. Examples of the threshold water activity include at least 0.20, at least 0.25, at least 0.30, at least 0.35, at least 0.40, at least 0.45, at least 0.50, at least 0.52, at least 0.54, at least 0.56, at most 0.58, at most 0.56, at most 0.54, and/or at most 0.52. References herein to a threshold water activity optionally may be expressed as a threshold minimum water activity and/or as a threshold maximum water activity. When both threshold minimum and threshold maximum water activity are utilized, the threshold water activity optionally may be referred to as a threshold water activity range or a water activity within a threshold range.

The dry heating at 160 may be performed with any suitable timing and/or sequence during methods 100. As examples, the dry heating at 160 may be performed subsequent to the providing at 110, subsequent to the cold washing at 120, subsequent to the culling at 130, subsequent to the outgassing at 140, subsequent to the compressing at 150, and/or prior to the pulverizing at 170.

Methods 100 may include initiating the dry heating at 160 within a threshold initiation time of ceasing the outgassing at 140. Stated differently, less than the threshold initiation time may elapse between performing the outgassing at 140 and performing the dry heating at 160. Initiating the dry heating within a threshold initiation time of ceasing the outgassing may decrease a potential for decay and/or decomposition of the outgassed seaweed prior to the dry heating at 160. Examples of the threshold initiation time are disclosed herein.

Pulverizing at 170 may include pulverizing the dried seaweed to produce and/or to generate pulverized seaweed. This may include pulverizing the dried seaweed with, via, and/or utilizing a pulverizing structure, examples of which are disclosed herein with reference to pulverizing structure 280 of systems 200. Examples of the pulverized seaweed are disclosed herein with reference to pulverized seaweed 82 of systems 200.

In some examples, the pulverizing at 170 may include pulverizing to a pulverized seaweed particle size. Examples of the pulverized seaweed particle size include at least 25 micrometers (μm), at least 50 μm, at least 75 μm, at least 100 μm, at least 150 μm, at least 200 μm, at least 250 μm, at least 300 μm, at least 350 μm, at most 1000 μm, at most 900 μm, at most 800 μm, at most 700 μm, at most 600 μm, at most 550 μm, at most 500 μm, at most 450 μm, and/or at most 400 μm.

The pulverizing at 170 may include isothermally, or at least substantially isothermally, pulverizing the dried seaweed. Additionally or alternatively, the pulverizing at 170 may include maintaining less than a threshold temperature change of the pulverized seaweed relative to the dried seaweed and/or of the dried seaweed during the pulverizing at 170. Examples of the threshold temperature change include 10° C., 8° C., 6° C., 5° C., 4° C., 3° C., 2° C., 1° C., 0.5° C., 0.25° C., or 0.1° C. Such a configuration may improve a taste and/or a smell of the pulverized seaweed when compared to seaweed that is heated while being pulverized. As an example, such a configuration may not impart a burned taste and/or smell to the pulverized seaweed and/or may impart, or maintain, a toasty taste and/or smell to the pulverized seaweed.

As discussed, methods 100 may be performed using any suitable structures, devices, implements, techniques, and the like to accomplish the functions and/or to meet the criteria set forth in the preceding discussion. As also discussed, it is within the scope of the present disclosure that methods 100 may, but are not required to be, performed via a system 200 that contains structures and/or other components configured to perform the methods.

FIG. 2 is a schematic illustration of examples of systems 200 for processing seaweed 10, according to the present disclosure. Systems 200 may include and/or be any suitable continuous and/or batch systems for generating dried seaweed 52, and optionally pulverized seaweed 82, from raw seaweed 12. Systems 200 systems may include any suitable selection of manual, mechanized, powered, and/or automated structures that are configured to do so. As shown in FIG. 2, systems 200 include a cold-wash structure 230, an outgas structure 240, and a dry-heat structure 250. As also shown in FIG. 2, systems 200 may include a cull structure 260, a compression structure 270, a pulverizing structure 280, and/or a controller 290.

As discussed, systems 200 may be configured and/or programmed to perform some or all of the steps of methods 100, according to the present disclosure; however, it is within the scope of the present disclosure that systems 200 may be utilized to process raw seaweed 12 to produce dried seaweed 52 and/or pulverized seaweed 82 without utilizing the entirety of methods 100. However, for the purpose of brevity, discussions of variables, options, ranges, times, thresholds, examples, and the like from the preceding discussion of methods 100 may be applied to systems 200, and vice versa.

Cold-wash structure 230 may be configured to wash, or to cold-wash, seaweed 10, in the form of raw seaweed 12, to produce and/or to generate cold-washed seaweed 32. In general, and as discussed in more detail herein with reference to methods 100, seaweed 10, in the form of raw seaweed 12, may be cold-washed within cold-wash structure 230, such as to remove undesired materials 34 from raw seaweed 12 and thereby produce cold-washed seaweed 32. In some examples, some seaweed 10 also may be removed with undesired materials 34, as illustrated in dashed lines in FIG. 2. As discussed in connection with methods 100, examples of such undesired materials include sand, debris, and/or materials other than raw seaweed 12.

Cold-wash structure 230 may include any suitable structure that may be adapted, configured, designed, and/or constructed to cold-wash raw seaweed 12 and/or to generate cold-washed seaweed 32. As an example, cold-wash structure 230 may be configured to contact raw seaweed 12 with cold water 36, which may be at a cold-water temperature, examples of which are disclosed herein.

In some examples, cold-wash structure 230 may be configured to immerse raw seaweed 12 in cold water 36. In some examples, cold-wash structure 230 may be configured to agitate or otherwise move raw seaweed 12 and/or cold water 36 relative to each other, such as to increase the contact between the raw seaweed and the cold water. In some examples, the cold-wash structure may be configured to flow the cold water across the raw seaweed. In some examples, the cold-wash structure may be configured to spray the raw seaweed with the cold water. Examples of cold-wash structure 230 and/or components thereof include a tank, a water tank, a nozzle, a water nozzle, an agitator, a sprayer, a pump, a stirrer, a conveyer, a vegetable washer, and/or a lobster washer.

After cold washing raw seaweed 12 with, or in, cold-wash structure 230 to produce cold-washed seaweed 32, cold-washed seaweed 32 may be outgassed, within outgas structure 240, to generate outgassed seaweed 42. Outgas structure 240 may be configured to receive cold-washed seaweed 32 and/or to outgas cold-washed seaweed 32 to produce and/or to generate outgassed seaweed 42.

Outgas structure 240 may include any suitable structure that may be adapted, configured, designed, and/or constructed to outgas cold-washed seaweed 32 and/or to generate outgassed seaweed 42. Outgas structure 240 may be configured to outgas cold-washed seaweed at an outgas temperature, examples of which are disclosed herein.

An example of outgas structure 240 includes a cooled environment that is sized, located, and/or otherwise configured to receive the cold-washed seaweed. More specific examples of outgas structure 240 includes an actively cooled environment, a naturally cooled environment, and a passively cooled environment. Yet another example of outgas structure 240 includes a refrigerated environment. Another example of outgas structure 240 includes a refrigerator.

Outgas structure 240 may be configured to convey air, or cooled air, over and/or past cold-washed seaweed. As examples, outgas structure 240 may include a fan and/or a blower configured to convey the air. Such a configuration may increase a rate at which cold-washed seaweed 32 outgasses to become outgassed seaweed 42.

Outgassed seaweed 42 then may be dry-heated, within dry-heat structure 250, to produce dried seaweed 52. Stated differently, dry-heat structure 250 may be configured to receive outgassed seaweed 42 and/or to dry-heat outgassed seaweed 42 to produce and/or to generate dried seaweed 52.

Dry heating of outgassed seaweed 42 may cause naturally occurring glutamates and/or mineral salts to remain within dried seaweed 52. As discussed in more detail herein, the use of dry-heat structure 250 to generate dried seaweed 52 produces dried seaweed 52 in which bacteria and pathogens have been killed or neutralized by sufficient heating of the seaweed to or beyond its pasteurization temperature. As also discussed in more detail herein, the use of dry-heat structure 250 to generate dried seaweed 52 may permit dried seaweed 52 to be nutritionally superior to conventional dried seaweed products, which may be produced without dry-heat structure 250 Additionally or alternatively, the use of dry-heat structure 250 to generate dried seaweed 52 may permit dried seaweed 52 to be produced in a manner that causes the naturally occurring glutamates and/or mineral salts to leach from the conventional dried seaweed products.

Dry-heat structure 250 may include any suitable structure that may be adapted, configured, designed, and/or constructed to dry-heat outgassed seaweed 42 and/or to generate dried seaweed 52. Dry-heat structure 250 may be configured to dry-heat outgassed seaweed 42 at a dry-heat temperature, examples of which are disclosed herein.

An example of dry-heating structure 250 includes a heated environment. Additional examples of dry-heating structure 250 includes an actively heated environment, a naturally heated environment, and/or a passively heated environment. Yet another example of dry-heating structure 250 includes a solar-heated environment. Another example of dry-heating structure 250 includes an oven, such as a conventional oven or a convection oven.

In some examples, dry-heating structure 250 may be configured to convey air, heated air, or dry-heated air, over and/or past outgassed seaweed 42. As examples, dry-heating structure 250 may include a fan and/or a blower configured to convey the air. Such a configuration may increase a rate at which outgassed seaweed 42 dries (i.e., loses liquid) to become dried seaweed 52.

As illustrated in dashed lines in FIG. 2, system 200 may include a cull structure 260. Cull structure 260, when present, may be adapted, configured, designed, and/or constructed to cull seaweed to generate a retained seaweed fraction 62 and a culled seaweed fraction 64. As discussed, retained seaweed fraction 62 may include portions of seaweed 10, or of raw seaweed 12, that may be acceptable for inclusion within dried seaweed 52, such as leaves of the seaweed. Alternatively, culled seaweed fraction 64 may include portions of seaweed 10, or of raw seaweed 12, that may be unacceptable and/or undesirable for inclusion within dried seaweed 52, such as seaweed stems, seaweed stipules, and/or seaweed veins of greater than a threshold size.

Cull structure 260 may be configured to facilitate manual culling of the seaweed and/or automated culling of the seaweed. Examples of cull structure 260 include a surface that supports seaweed 10, a cutting assembly or a tool configured to separate portions of the seaweed to form retained seaweed fraction 62 and culled seaweed fraction 64, and/or a seaweed conveyor. In some examples, cull structure 260 may include a vision system, which may be automated and utilized to characterize seaweed 10 into retained seaweed fraction 62 and culled seaweed fraction 64, and/or an end effector, which may be configured to separate the seaweed into the retained seaweed fraction and the culled seaweed fraction.

As illustrated in FIG. 2, cull structure 260 may be configured to receive cold-washed seaweed 32 and to generate retained seaweed fraction 62 and culled seaweed fraction 64 from the cold-washed seaweed. In such a configuration, systems 200 may provide retained seaweed fraction 62 to outgas structure 240 as cold-washed seaweed 32. However, this is not required of all examples, and it is within the scope of the present disclosure that cull structure 260 may be included and/or utilized at any suitable location within systems 200, including prior to cold-wash structure 230, subsequent to cold-wash structure 230, prior to outgas structure 240, subsequent to outgas structure 240, and/or prior to dry-heat structure 250.

As also illustrated in dashed lines in FIG. 2, systems 200 may include a compression structure 270. Compression structure 270, when present, may be adapted, configured, designed, and/or constructed to compress outgassed seaweed 42, such as to separate liquids 74, such as water, from the outgassed seaweed. This may include compression to generate both liquids 74 and outgassed and dewatered seaweed 72 from outgassed seaweed 42. In such examples, systems 200 may be configured to provide outgassed and dewatered seaweed 72 to dry-heat structure 250 as outgassed seaweed 42. Such a configuration may decrease a drying time for seaweed within dry-heat structure 250, may increase an efficiency of dry-heat structure 250, and/or may increase an overall energy efficiency of systems 200.

An example of compression structure 270 includes a mechanical press. Another example of compression structure 270 includes a hydraulic press. Yet another example of compression structure 270 includes an electric press. Another example of compression structure 270 includes a pneumatic press.

As illustrated in dashed lines in FIG. 2, systems 200 also may include a pulverizing structure 280, which also may be referred to as a pulverizer, 280. Pulverizing structure 280, when present, may be adapted, configured, designed, and/or constructed to pulverize dried seaweed 52 and/or to generate pulverized seaweed 82 from the dried seaweed. Such a configuration may permit pulverized seaweed 82 to be utilized as an ingredient in various products, examples of which are disclosed herein.

An example of pulverizing structure 280 includes an isothermal, or an at least substantially isothermal, pulverizing structure. Another example of pulverizing structure 280 includes a hammer mill. Yet another example of pulverizing structure 280 includes a roller mill. In general, pulverizing structure 280 may be configured to generate pulverized seaweed 82 without adding, or without adding appreciable, thermal energy to dried seaweed 52. Such a configuration may decrease a potential for burning and/or charring of the seaweed within and/or by pulverizing structure 280, as discussed in more detail herein.

As used herein, systems 200 are described as potentially including various structures (e.g., one or more of cold-wash structure 230, outgas structure 240, dry-heat structure 250, cull structure 260, compression structure 270, and pulverizing structure 280). It is within the scope of the present disclosures that these structures may include any suitable type and/or number of components, devices, tools, and the like that are configured to achieve the indicated result and/or to perform the indicated actions (which may include steps of methods 100). It also is within the scope of the present disclosure that systems 200 optionally may include a suitable conveyor structure to move the seaweed between at least some of the various structures, such as an a mechanized and/or automated manner. It further is within the scope of the present disclosure that seaweed 10 may be moved between at least some of the various structures manually, such as by operators of the system. The structures of systems 200 additionally or alternatively may be referred to herein as assemblies, devices, and/or modules.

As illustrated in dashed lines in FIG. 2, systems 200 may include a controller 290. Controller 290, when present, may be adapted, configured, designed, constructed, and/or programmed to control the operation of at least one other component of systems 200. This may include controlling the operation of cold-wash structure 230, of outgas structure 240, of dry-heat structure 250, of cull structure 260, of compression structure 270, and/or of pulverizing structure 280. In some examples, controller 290 may be programmed to direct the at least one other component of systems 200 to operate according to any suitable step and/or steps of methods 100, which are discussed in more detail herein. Additionally or alternatively, controller 290 may be programmed to direct the at least one other component of systems 200 to operate with any suitable parameter as described in methods 100. Examples of controller 290 include an electronic controller, a dedicated controller, a special-purpose controller, a personal computer, a special-purpose computer, a display device, a logic device, a memory device, and/or a memory device having computer-readable storage media. Controller 290, when present, may include, control, and/or communicate with any suitable type and number of sensors, timers, comparators, user-input devices, and/or actuators.

Dried seaweed and/or pulverized seaweed produced by systems 200 and/or by performing methods 100 also may be referred to herein as processed seaweed. FIG. 3 illustrates an example of dried seaweed 52 in the form of pulverized seaweed 82 produced via methods 100 and/or utilizing systems 200 according to the present disclosure. The processed seaweed may be utilized within and/or incorporated into baked goods. Examples of such baked goods include bread, loaf bread, buns, rolls, crusts, bagels, pastries, and/or flatbreads. FIG. 4 illustrates an example of baked goods 84, such as bread 86 containing dried seaweed 52, such as pulverized seaweed 82.

There may be significant benefits to producing and/or generating processed seaweed utilizing systems 200 and/or by performing methods 100. As an example, seaweed is a sustainable food product, and the improved taste, texture, and/or baking compatibility of processed seaweed, disclosed herein, when compared to conventional seaweed products may facilitate wider adoption of seaweed for human consumption. As an additional benefit, approximately 1.5 kilograms of carbon dioxide are sequestered into the ocean as a result of producing the seaweed utilized to produce a single loaf of bread containing pulverized seaweed 82.

It is noteworthy that conventionally processed seaweed, which is not produced utilizing systems 200 and/or by performing methods 100 according to the present disclosure, generally is not compatible with incorporation into baked goods. Such conventionally processed seaweed additionally or alternatively may be referred to herein as conventional seaweed products, conventional dried seaweed, and/or conventional dried seaweed products. Instead, conventional processed seaweed generally is produced by a conventional process in which raw seaweed is first exposed to a high-temperature wash. While the high-temperature wash may beneficially pasteurize the seaweed, it also detrimentally destroys the cellular structure of the seaweed, destroys nutrients within the seaweed, and washes away naturally occurring minerals within the seaweed. This both changes the subsequent behavior of the conventional processed seaweed when exposed to further processing and causes the conventional processed seaweed to be less nutritious when compared to processed seaweed produced utilizing systems 200 and/or by performing methods 100 according to the present disclosure.

Such conventional processed seaweed imparts a "beachy" or a "marine" scent and/or flavor to the baked goods, which many consumers dislike. It also may discolor the baked goods, as compared to conventional baked goods that do not contain conventionally processed seaweed. In addition, conventional processed seaweed produces baked goods that are hard, woody, and/or that do not have a pleasing texture. Conventional processed seaweed also combines with water in a manner that makes it relatively incompatible with baked goods, and the resulting combination does not mix well with conventional flours. Conventional processed seaweed also blackens and/or chars when exposed to conventional baking temperatures of 190-220° C. In addition, conventional processed seaweed includes glutamic acids, which dissolve in water to produce a natural form of monosodium glutamate (MSG), which many consumers wish to avoid.

In contrast, processed seaweed produced utilizing systems 200 and/or by performing methods 100, according to the present disclosure, is more visually pleasing and more nutritious and readily may be incorporated into conventional baking processes. The processed seaweed has a color that resembles cracked grains and a toasty scent and taste. This may be due to the processed seaweed undergoing the Maillard reaction in a manner that is similar to conventional flours.

The texture of the processed seaweed produced utilizing systems 200 and/or by performing methods 100, according to the present disclosure, differs significantly from conventional processed seaweed because the processed seaweed is not blanched and/or stewed at high temperatures. The processed seaweed also includes a higher concentration of naturally occurring glutamates and mineral salts, which provide significant health benefits for consumers. The processed seaweed also includes higher concentrations of vitamins K and D, as well as additional calcium when compared to conventional seaweed products. In addition, the processed seaweed has 60% fewer calories, 64% less sodium, 2% more protein, and additional fiber when compared to the conventional seaweed products.

Furthermore, the processed seaweed maintains a greater concentration of intact cell walls when compared to conventional processed seaweed. As a result, it has been observed that baked goods that incorporate the processed seaweed generally exhibit improved moisture regulation and increased shelf life, which may be due to these intact cell walls regulating water content within the baked goods. More specifically, the processed seaweed absorbs water when cooling after baking and/or packaging, thereby decreasing a wetness of the baked goods. The processed seaweed then releases this moisture slowly, improving long-term shelf life of the baked goods.

When utilized in baking, the processed seaweed mixes readily with flour and acts more like conventional flour than conventional seaweed products. As an example, the processed seaweed absorbs water in a manner that is similar to conventional flour and visually looks like conventional flour. In addition, the processed seaweed does not burn or char at normal baking temperatures. This may be due to the par baking during the dry heating at 160 and/or within dry-heat structure 250.

As discussed, the processed seaweed also is relatively higher in glutamates. This increases the savory and salty flavor of baked goods that include the processed seaweed. In addition, the glutamates replace sodium in the baking reaction, thereby permitting significantly less sodium to be utilized in the baked goods when compared to conventional baked goods that only utilize conventional flours.

In a specific example, 10 milligrams (mg) of processed seaweed is incorporated into a 500-gram loaf of bread. Incorporation of the processed seaweed permits the table salt (sodium chloride) content of the loaf to be reduced to 25-50% of what would be needed without the processed seaweed due to the presence of other naturally occurring salts, such as magnesium chloride, calcium chloride, and potassium chloride, in the processed seaweed.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A method of processing seaweed, the method comprising:
cold washing raw seaweed to generate cold-washed seaweed;
outgassing the cold-washed seaweed for an outgas time to generate outgassed seaweed; and
dry heating the outgassed seaweed to generate dried seaweed.

A2. The method of paragraph A1, wherein the cold washing includes removing undesired material from the raw seaweed.

A3. The method of paragraph A2, wherein the undesired material includes at least one of sand, debris, and materials other than the raw seaweed.

A4. The method of any of paragraphs A1-A2, wherein the cold washing includes contacting the raw seaweed with cold water at a cold water temperature.

A5. The method of paragraph A4, wherein the cold water temperature is at least one of:
(i) at least 0.25 degrees Celsius (° C.), at least 0.5° C., at least 0.75° C., at least 1° C., at least 2° C., at least 3° C., at least 4° C., at least 5° C., at least 6° C., at least 8° C., or at least 10° C.; and
(ii) at most 20° C., at most 18° C., at most 16° C., at most 14° C., at most 12° C., at most 10° C., at most 8° C., at most 6° C., at most 5° C., at most 4° C., at most 3.5° C., a most 3° C., at most 2.5° C., or at most 2° C.

A6. The method of any of paragraphs A4-A5, wherein the cold water temperature is selected such that the cold-washed seaweed retains at least a threshold salts fraction of naturally occurring mineral salts in the raw seaweed.

A7. The method of paragraph A6, wherein the threshold salts fraction is 50 weight percent (wt %), 55 wt %, 60 wt %, 65 wt %, 70 wt %, 75 wt %, 80 wt %, 85 wt %, 90 wt %, 95 wt %, or 99 wt %.

A8. The method of any of paragraphs A4-A7, wherein the cold water temperature is selected such that the cold-washed seaweed retains at least a threshold cell wall fraction of cell walls in the raw seaweed.

A9. The method of paragraph A8, wherein the threshold cell wall fraction is 50 weight percent (wt %), 55 wt %, 60 wt %, 65 wt %, 70 wt %, 75 wt %, 80 wt %, 85 wt %, 90 wt %, 95 wt %, or 99 wt %.

A10. The method of any of paragraphs A4-A9, wherein the cold washing includes immersing the raw seaweed in cold water.

A11. The method of any of paragraphs A4-A10, wherein the cold washing includes flowing cold water across the raw seaweed.

A12. The method of paragraph A11, wherein the flowing includes flowing at a cold water flow rate of at least one of:
(i) at least 6 liters per minute (L/m), at least 7 L/m, at least 8 L/m, at least 9 L/m, at least 10 L/m, at least 12 L/m, at least 14 L/m, at least 16 L/m, at least 18 L/m, or at least 20 L/m; and
(ii) at most 24 L/m, at most 22 L/m, at most 20 L/m, at most 18 L/m, at most 16 L/m, at most 14 L/m, at most 12 L/m, or at most 10 L/m.

A13. The method of any of paragraphs A11-A12, wherein the cold washing includes spraying the raw seaweed with cold water.

A14. The method of any of paragraphs A4-A13, wherein the method includes aerating the cold water during the contacting.

A15. The method of any of paragraphs A4-A14, wherein the method includes agitating the cold water during the contacting.

A16. The method of any of paragraphs A4-A15, wherein the method includes maintaining at most a threshold cold water pressure of the cold water during the contacting.

A17. The method of paragraph A16, wherein the threshold cold water pressure is 2 kilopascals (kPa), 3 kPa, 4 kPa, 5 kPa, 6 kPa, 7 kPa, 8 kPa, 10 kPa, 15 kPa, or 20 kPa.

A18. The method of any of paragraphs A16-A17, wherein the cold water pressure is selected such that the cold-washed seaweed retains at least a/the threshold cell wall fraction of cell walls in the raw seaweed.

A19. The method of paragraph A18, wherein the threshold cell wall fraction is 50 weight percent (wt %), 55 wt %, 60 wt %, 65 wt %, 70 wt %, 75 wt %, 80 wt %, 85 wt %, 90 wt %, 95 wt %, or 99 wt %.

A20. The method of any of paragraphs A4-A19, wherein the cold washing includes conveying the raw seaweed through the cold water during the contacting.

A21. The method of any of paragraphs A4-A20, wherein the contacting includes contacting for a cold-wash time of at least one of:
(i) at least 5 minutes, at least 10 minutes, at least 15 minutes, at least 20 minutes, or at least 30 minutes; and
(ii) at most 60 minutes, at most 50 minutes, at most 40 minutes, at most 30 minutes, at most 20 minutes, or at most 10 minutes.

A22. The method of any of paragraphs A1-A21, wherein the cold washing includes cold washing without addition, to at least one of the raw seaweed and the cold-washed seaweed, of at least one of:
(i) a salt;
(ii) a soap;
(iii) a cleanser;
(iv) a bactericide;
(v) a preservative;
(vi) a fixative;
(vii) a brightener; and
(viii) a chemical other than water or tap water.

A23. The method of any of paragraphs A1-A22, wherein the outgassing includes outgassing at an outgas temperature.

A24. The method of paragraph A23, wherein the outgas temperature is selected such that less that a threshold decomposed fraction of the cold-washed seaweed is decomposed in the outgassed seaweed.

A25. The method of paragraph A24, wherein the threshold decomposed fraction is 5%, 4%, 3%, 2%, 1%, 0.5%, 0.25%, or 0.1%.

A26. The method of any of paragraphs A23-A25, wherein the outgas temperature is at least one of:
(i) at least 0.25 degrees Celsius (° C.), at least 0.5° C., at least 0.75° C., at least 1° C., at least 2° C., at least 3° C., at least 4° C., at least 5° C., at least 6° C., at least 8° C., or at least 10° C.; and
(ii) at most 14° C., at most 12° C., at most 10° C., at most 8° C., at most 6° C., at most 5° C., at most 4° C., at most 3.5° C., a most 3° C., at most 2.5° C., or at most 2° C.

A27. The method of any of paragraphs A1-A26, wherein the outgassing includes outgassing for the outgas time of at least one of:
(i) at least 3 hours, at least 4 hours, at least 6 hours, at least 9 hours, at least 12 hours, at least 15 hours, at least 18 hours, at least 21 hours, at least 24 hours, at least 27 hours, at least 30 hours, at least 33 hours, at least 36 hours, at least 39 hours, at least 42 hours, or at least 45 hours; and
(ii) at most 96 hours, at most 90 hours, at most 84 hours, at most 78 hours, at most 72 hours, at most 69 hours, at most 66 hours, at most 63 hours, at most 60 hours, at most 57 hours, at most 54 hours, at most 51 hours, at most 48 hours, at most 45 hours, at most 42 hours, at most 39 hours, at most 36 hours, at most 33 hours, at most 30 hours, at most 27 hours, or at most 24 hours.

A28. The method of any of paragraphs A1-A27, wherein the outgassing includes outgassing at less than a threshold outgas humidity, wherein the threshold outgas humidity is 20 percent relative humidity (% RH), 18% RH, 16% RH, 14% RH, 12% RH, 10% RH, 8% RH, 6% RH, 4% RH, 2% RH, or 1% RH.

A29. The method of any of paragraphs A1-A28, wherein the outgassing includes outgassing a stack of cold-washed seaweed, wherein the stack of cold-washed seaweed includes a plurality of layers of cold-washed seaweed.

A29.1. The method of any of paragraphs A1-A29, wherein the outgassing is at least partially concurrent with the dry heating.

A29.2. The method of any of paragraphs A1-A29.1, wherein at least a portion of the outgassing occurs subsequent to the dry heating.

A29.3. The method of any of paragraphs A1-A29.2, wherein the outgassing is completed prior to packing, using, or storing the dried seaweed.

A30. The method of any of paragraphs A1-A29.3, wherein the method includes arranging the cold-washed seaweed in a single layer during the dry heating.

A31. The method of any of paragraphs A1-A30, wherein the dry heating includes dry heating at a dry-heat temperature.

A32. The method of paragraph A31, wherein the dry-heat temperature is less than at least one of:
(i) a char temperature for the outgassed seaweed; and
(ii) a burn temperature for the outgassed seaweed.

A33. The method of any of paragraphs A31-A32, wherein the dry-heat temperature is greater than a pasteurization temperature for the outgassed seaweed.

A34. The method of any of paragraphs A1-A33, wherein the dry heating includes:
(i) initiating the dry heating at a first dry-heat temperature;
(ii) ramping the dry heating from the first dry-heat temperature to a second dry-heat temperature; and
(iii) maintaining the dry heating at the second dry-heat temperature.

A35. The method of paragraph A34, wherein the first dry-heat temperature is at least one of:
(i) at least 30° C., at least 32° C., at least 34° C., at least 36° C., at least 38° C., or at least 40° C.; and
(ii) at most 46° C., at most 44° C., at most 42° C., at most 40° C., or at most 38° C.

A36. The method of any of paragraphs A34-A35, wherein the ramping includes ramping during a ramp time of at least one of:
(i) at least 2 minutes, at least 4 minutes, at least 6 minutes, at least 8 minutes, or at least 10 minutes; and
(ii) at most 30 minutes, at most 25 minutes, at most 20 minutes, at most 15 minutes, or at most 10 minutes.

A37. The method of any of paragraphs A34-A36, wherein the second dry-heat temperature is at least one of:
(i) at least 70° C., at least 71° C., at least 72° C., or at least 73° C.;
(ii) at most 75° C., at most 74° C., or at most 73° C.; and
(iii) 72.2° C.

A38. The method of any of paragraphs A34-A37, wherein the maintaining the dry heating at the second dry-heat temperature includes maintaining for a second dry-heat time, and further wherein the second dry-heat time is at least one of:
(i) at least 10 minutes, at least 15 minutes, at least 20 minutes, at least 25 minutes, or at least 30 minutes; and
(ii) at most 48 hours, at most 45 hours, at most 42 hours, at most 39 hours, at most 36 hours, at most 33 hours, at most 30 hours, at most 27 hours, at most 24 hours, at most 21 hours, at most 18 hours, at most 15 hours, or at most 12 hours.

A39. The method of any of paragraphs A34-A38, wherein the method further includes: decreasing the dry heating from the second dry-heat temperature to a third dry-heat temperature; and
(ii) maintaining the dry heating at the third dry-heat temperature.

A40. The method of paragraph A39, wherein the third dry-heat temperature is at least one of:
(i) at least 51° C., at least 54° C., at least 57° C., at least 60° C., at least 63° C., or at least 66° C.; and
(ii) at most 75° C., at most 72° C., at most 69° C., at most 66° C., at most 63° C., at most 60° C., at most 57° C., or at most 54° C.

A41. The method of any of paragraphs A39-A40, wherein the maintaining the dry heating at the third dry-heat temperature includes maintaining for a third dry-heat time, and further wherein the third dry-heat time is at least one of:
(i) at least 6 hours, at least 9 hours, at least 12 hours, at least 15 hours, at least 18 hours, at least 21 hours, or at least 24 hours; and
(ii) at most 48 hours, at most 45 hours, at most 42 hours, at most 39 hours, at most 36 hours, at most 33 hours, at most 30 hours, at most 27 hours, at most 24 hours, at most 21 hours, at most 18 hours, at most 15 hours, or at most 12 hours.

A42. The method of any of paragraphs A1-A41, wherein the dry heating includes dry heating until a mass-ratio of a mass of the dried seaweed to a mass of the outgassed seaweed is at least one of:
(i) at least 0.04, at least 0.05, at least 0.06, at least 0.07, at least 0.08, at least 0.09, or at least 0.10; and
(ii) at most 0.12, at most 0.11, at most 0.10, at most 0.09, at most 0.08, at most 0.07, or at most 0.06.

A43. The method of any of paragraphs A1-A42, wherein the dry heating includes dry heating to a threshold water activity within the dried seaweed.

A44. The method of paragraph A43, wherein the threshold water activity is at least one of:
(i) at least 0.20, at least 0.25, at least 0.30, at least 0.35, at least 0.40, at least 0.45, at least 0.50, at least 0.52, at least 0.54, or at least 0.56; and
(ii) at most 0.58, at most 0.56, at most 0.54, or at most 0.52.

A45. The method of any of paragraphs A1-A44, wherein the method further includes providing the raw seaweed.

A46. The method of paragraph A45, wherein the providing the raw seaweed includes providing a raw seaweed mixture that includes a plurality of varieties of seaweed.

A47. The method of any of paragraphs A1-A46, wherein the raw seaweed includes at least one, and optionally at least two of, and further optionally at least three of kelp, sugar kelp, skinny kelp, rockweed, dulse, red dulse, wakame, kombu, nori, hijiki, Irish moss, and sea lettuce.

A48. The method of paragraph A47, wherein the providing the raw seaweed includes at least one of:
(i) purchasing the raw seaweed; and
(ii) harvesting the raw seaweed.

A49. The method of any of paragraphs A1-A48, wherein the method includes initiating the cold washing in less than a threshold processing time from harvest of the raw seaweed.

A50. The method of paragraph A49, wherein the threshold processing time is 3 hours, 6 hours, 12 hours, 18 hours, 24 hours, 30 hours, 36 hours, 48 hours, 60 hours, or 72 hours.

A51. The method of any of paragraphs A1-A50, wherein the method further includes culling a fraction of the seaweed to generate a culled seaweed fraction and a retained seaweed fraction.

A52. The method of paragraph A51, wherein the culling includes culling the cold-washed seaweed, and further wherein the method includes utilizing the retained seaweed fraction during the outgassing as the cold-washed seaweed.

A53. The method of any of paragraphs A51-A52, wherein the culling includes removing at least one undesired component of the seaweed as the culled seaweed fraction.

A54. The method of paragraph A53, wherein the at least one undesired component of the seaweed includes at least one of seaweed stems, seaweed stipules, and seaweed veins of greater than a threshold size.

A55. The method of any of paragraphs A1-A54, wherein the method further includes compressing the outgassed seaweed to separate water from the outgassed seaweed and to generate outgassed and dewatered seaweed.

A56. The method of paragraph A55, wherein the method includes utilizing the outgassed and dewatered seaweed during the dry heating as the outgassed seaweed.

A57. The method of any of paragraphs A55-A56, wherein the compressing includes separating a threshold fraction of water, present within the outgassed seaweed, from the outgassed seaweed.

A58. The method of paragraph A57, wherein the threshold fraction of water is at least one of:
(i) at least 20%, at least 30%, at least 40%, at least 50%, or at least 60%; and
(ii) at most 80%, at most 70%, at most 60%, at most 50%, or at most 40%.

A59. The method of any of paragraphs A1-A58, wherein the method further includes pulverizing the dried seaweed to generate pulverized seaweed.

A60. The method of paragraph A59, wherein the pulverizing includes pulverizing to a pulverized seaweed particle size of at least one of:
(i) at least 25 micrometers ($\mu m$), at least 50 $\mu m$, at least 75 $\mu m$, at least 100 $\mu m$, at least 150 $\mu m$, at least 200 $\mu m$, at least 250 $\mu m$, at least 300 $\mu m$, or at least 350 $\mu m$; and
(ii) at most 1000 $\mu m$, at most 900 $\mu m$, at most 800 $\mu m$, at most 700 $\mu m$, at most 600 $\mu m$, at most 550 $\mu m$, at most 500 $\mu m$, at most 450 $\mu m$, or at most 400 $\mu m$.

A61. The method of any of paragraphs A59-A60, wherein the pulverizing includes isothermally, or at least substantially isothermally, pulverizing the dried seaweed.

A62. The method of any of paragraphs A59-A61, wherein the pulverizing includes maintaining less than a threshold temperature change of the pulverized seaweed relative to the dried seaweed, wherein the threshold temperature change is 10° C., 8° C., 6° C., 5° C., 4° C., 3° C., 2° C., 1° C., 0.5° C., 0.25° C., or 0.1° C.

A63. The method of any of paragraphs A59-A62, wherein the pulverizing includes utilizing at least one of a hammer mill and a roller mill.

A64. The method of any of paragraphs A1-A63, wherein the cold washing is prior to the outgassing.

A65. The method of any of paragraphs A1-A64, wherein the outgassing is prior to the dry heating.

A66. The method of any of paragraphs A1-A65, wherein the method includes at least one of:
(i) initiating the outgassing within a threshold initiation time of ceasing the cold washing; and
(ii) initiating the dry heating within the threshold initiation time of ceasing the outgassing.

A67. The method of paragraph A66, wherein the threshold initiation time is 5 minutes, 10 minutes, 15 minutes, 30 minutes, 45 minutes, 1 hour, 2 hours, 4 hours, 6 hours, 9 hours, 12 hours, 18 hours, or 24 hours.

B1. Processed seaweed produced according to the method of any of paragraphs A1-A67.

B2. The processed seaweed of paragraph B1, wherein the processed seaweed is at least one of dried seaweed and pulverized seaweed.

B3. Use of the method of any of paragraphs A1-A67 to produce at least one of processed seaweed, dried seaweed, and pulverized seaweed.

B4. The use of the processed seaweed of any of paragraphs B1-B3, the dried seaweed produced by the method of any of paragraphs A1-A67, or the pulverized seaweed produced by the method of any of paragraphs A59-A63 to produce baked goods.

B5. The use of paragraph B4, wherein the baked goods include at least one of bread, loaf bread, buns, rolls, crusts, bagels, and flatbreads.

B6. Baked goods containing the processed seaweed of any of paragraphs B1-B3, or processed seaweed produced by the method of any of paragraphs A1-A67.

B7. The baked goods of paragraph B6, wherein the baked goods include one or more of bread, loaf bread, buns, rolls, crusts, bagels, pastries, and flatbreads.

C1. A system for processing seaweed, the system comprising:
a cold-wash structure configured to cold-wash raw seaweed to generate cold-washed seaweed;
an outgas structure configured to outgas the cold-washed seaweed to generate outgassed seaweed; and
a dry-heat structure configured to dry-heat the outgassed seaweed to generate dried seaweed.

C2. The system of paragraph C1, wherein the cold-wash structure is configured to contact the raw seaweed with cold water at a cold water temperature.

C3. The system of paragraph C2, wherein the cold-wash structure is configured to at least one of:
(i) immerse the raw seaweed in the cold water;
(ii) agitate the cold water and/or the raw seaweed during contact between the cold water and the raw seaweed;
(iii) convey the raw seaweed through the cold water;
(iv) flow the cold water across the raw seaweed; and
(v) spray the raw seaweed with the cold water.

C4. The system of any of paragraphs C1-C3, wherein the cold-wash structure includes, or is, at least one of:
(i) a tank;
(ii) a water tank;
(iii) a nozzle;
(iv) a water nozzle;
(v) an agitator;
(vi) a sprayer;
(vii) a pump;
(viii) a stirrer;
(ix) a conveyer;
(x) a vegetable washer; and
(xi) a lobster washer.

C5. The system of any of paragraphs C1-C4, wherein the outgas structure is configured to outgas the cold-washed seaweed at an outgas temperature.

C6. The system of any of paragraphs C1-05, wherein the outgas structure includes at least one of:
(i) a cooled environment;
(ii) an actively cooled environment;
(iii) a naturally cooled environment;
(iv) a passively cooled environment;
(v) a refrigerated environment; and
(vi) a refrigerator.

C7. The system of any of paragraphs C1-C6, wherein the dry-heat structure is configured to dry-heat the outgassed seaweed at a dry-heat temperature.

C8. The system of any of paragraphs C1-C7, wherein the dry-heat structure includes at least one of:
(i) a heated environment;
(ii) an actively heated environment;
(iii) a naturally heated environment;
(iv) a passively heated environment;
(v) a solar-heated environment; and
(vi) an oven.

C9. The system of any of paragraphs C1-C8, wherein the system further includes a cull structure configured to cull the seaweed to generate a culled seaweed fraction and a retained seaweed fraction.

C10. The system of paragraph C9, wherein the cull structure includes at least one of:
(i) a surface that supports the seaweed;
(ii) a cutting assembly configured to separate portions of the seaweed;
(iii) a tool configured to separate portions of the seaweed; and
(iv) a seaweed conveyor.

C11. The system of any of paragraphs C1-C10, wherein the system further includes a compression structure configured to compress the outgassed seaweed to separate water from the outgassed seaweed and to generate outgassed and dewatered seaweed.

C12. The system of paragraph C11, wherein the compression structure includes at least one of:
(i) a mechanical press;
(ii) a hydraulic press;
(iii) an electric press; and
(iv) a pneumatic press.

C13. The system of any of paragraphs C1-C12, wherein the system further includes a pulverizing structure configured to pulverize the dried seaweed to generate pulverized seaweed.

C14. The system of paragraph C13, wherein the pulverizing structure includes at least one of:
(i) an isothermal, or at least substantially isothermal, pulverizing structure;
(ii) a hammer mill; and
(iii) a roller mill.

C15. The system of any of paragraphs C1-C14, wherein the system further includes a controller programmed to control operation of at least one other component of the system.

C16. The system of paragraph C15, wherein the controller is programmed to control the operation of the at least one other component of the system by controlling the at least one other component of the system to perform any suitable step and/or steps of any of the methods of any of paragraphs A1-A67.

C17. The system of any of paragraphs C1-C16, wherein the system is configured to perform any suitable step and/or to operate with any suitable parameter of any of the methods of any of paragraphs A1-A67.

INDUSTRIAL APPLICABILITY

The systems and methods disclosed herein are applicable to the seaweed products and baking industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of processing seaweed, the method comprising:
cold washing raw seaweed with cold water at a cold water temperature to generate cold-washed seaweed;
outgassing the cold-washed seaweed for an outgas time to generate outgassed seaweed; and
dry heating the outgassed seaweed to generate dried seaweed.

2. The method of claim 1, wherein the cold water temperature is selected such that the cold-washed seaweed retains at least a threshold salts fraction of naturally occurring mineral salts in the raw seaweed, and further wherein the threshold salts fraction is 50 weight percent.

3. The method of claim 1, wherein the cold water temperature is selected such that the cold-washed seaweed retains at least a threshold cell wall fraction of cell walls in the raw seaweed, and further wherein the threshold cell wall fraction is 50 weight percent.

4. The method of claim 1, wherein the cold washing includes contacting the raw seaweed with cold water at a cold water temperature of at least 0.25 degrees Celsius (° C.) and at most 20° C., and wherein the outgassing includes outgassing at an outgas temperature of at least 0.25 degrees Celsius (° C.) and at most 14° C.

5. The method of claim 4, wherein the method includes maintaining at most a threshold cold water pressure of the cold water during the contacting, and further wherein the threshold cold water pressure is 20 kilopascals (kPa).

6. The method of claim 5, wherein the threshold cold water pressure is selected such that the cold-washed seaweed retains at least a threshold cell wall fraction of cell walls in the raw seaweed, and further wherein the threshold cell wall fraction is 50 weight percent.

7. The method of claim 4, wherein the outgas temperature is selected such that less than a threshold decomposed fraction of the cold-washed seaweed is decomposed in the outgassed seaweed, and further wherein the threshold decomposed fraction is 5%.

8. The method of claim 1, wherein the cold washing includes cold washing without addition, to at least one of the raw seaweed and the cold-washed seaweed, of:
(i) a salt;
(ii) a soap;
(iii) a cleanser;
(iv) a bactericide;
(v) a preservative;
(vi) a fixative;
(vii) a brightener; and
(viii) a chemical other than water or tap water.

9. The method of claim 1, wherein the cold washing is prior to the outgassing, and wherein at least a portion of the outgassing occurs subsequent to the dry heating.

10. The method of claim 1, wherein the outgas time is at least 3 hours and at most 96 hours.

11. The method of claim 1, wherein the dry heating includes dry heating at a dry-heat temperature that is less than at least one of:
  (i) a char temperature for the outgassed seaweed; and
  (ii) a burn temperature for the outgassed seaweed; and
  wherein the dry-heat temperature is greater than a pasteurization temperature for the outgassed seaweed.

12. The method of claim 1, wherein the dry heating includes:
  (i) initiating the dry heating at a first dry-heat temperature;
  (ii) ramping the dry heating from the first dry-heat temperature to a second dry-heat temperature; and
  (iii) maintaining the dry heating at the second dry-heat temperature.

13. The method of claim 12, wherein the first dry-heat temperature is at least 30° C. and at most 46° C., and wherein the second dry-heat temperature is at least 70° C. and at most 75° C.

14. The method of claim 12, wherein the method further includes:
  (i) decreasing the dry heating from the second dry-heat temperature to a third dry-heat temperature; and
  (ii) maintaining the dry heating at the third dry-heat temperature.

15. The method of claim 14, wherein the third dry-heat temperature is at least 51° C. and at most 75° C.

16. The method of claim 1, wherein the dry heating includes dry heating until a mass-ratio of a mass of the dried seaweed subsequent to the dry heating to a mass of the outgassed seaweed prior to the dry heating is at least 0.04 and at most 0.12.

17. The method of claim 1, wherein the dry heating includes dry heating to a threshold water activity within the dried seaweed, and further wherein the threshold water activity is at least 0.20 and at most 0.58.

18. The method of claim 1, wherein the method further includes compressing the outgassed seaweed to separate water from the outgassed seaweed.

19. The method of claim 1, wherein the method further includes pulverizing the dried seaweed to generate pulverized seaweed.

20. The method of claim 19, wherein the pulverizing includes pulverizing to a pulverized seaweed particle size of at least 25 micrometers (μm) and at most 1000 μm.

21. The method of claim 19, wherein the pulverizing includes maintaining less than a threshold temperature change of the pulverized seaweed relative to the dried seaweed, and further wherein the threshold temperature change is 10° C.

22. The method of claim 19, wherein the pulverizing includes utilizing at least one of a hammer mill and a roller mill.

* * * * *